(12) United States Patent
Sunnell et al.

(10) Patent No.: US 9,374,731 B2
(45) Date of Patent: Jun. 21, 2016

(54) METHOD AND RADIO NETWORK NODE FOR MANAGING RADIO RESOURCES

(75) Inventors: Kai-Erik Sunnell, Bromma (SE); Magnus Hurd, Stockholm (SE); Pontus Arvidsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/389,572

(22) PCT Filed: Apr. 16, 2012

(86) PCT No.: PCT/SE2012/050408
§ 371 (c)(1),
(2), (4) Date: Sep. 30, 2014

(87) PCT Pub. No.: WO2013/158000
PCT Pub. Date: Oct. 24, 2013

(65) Prior Publication Data
US 2015/0055460 A1  Feb. 26, 2015

(51) Int. Cl.
| | |
|---|---|
| *H04W 28/26* | (2009.01) |
| *H04W 28/02* | (2009.01) |
| *H04W 76/06* | (2009.01) |
| *H04W 72/04* | (2009.01) |
| H04W 72/10 | (2009.01) |

(52) U.S. Cl.
CPC ........ *H04W 28/0215* (2013.01); *H04W 72/048* (2013.01); *H04W 76/068* (2013.01); *H04W 72/10* (2013.01)

(58) Field of Classification Search
CPC . H04W 76/046; H04W 76/068; H04W 76/06; H04W 76/062; H04W 76/066; H04W 76/064; H04W 52/0212; H04W 72/04
See application file for complete search history.

(56) References Cited

U.S. PATENT DOCUMENTS

| | | | | | |
|---|---|---|---|---|---|
| 6,112,093 | A | * | 8/2000 | Nordlund | H04W 48/18 370/332 |
| 8,144,639 | B1 | * | 3/2012 | Ghaus | H04W 76/048 370/311 |
| 8,155,072 | B2 | * | 4/2012 | Warrillow | H04L 12/5695 370/330 |

(Continued)

FOREIGN PATENT DOCUMENTS

| | | |
|---|---|---|
| EP | 1 619 906 A1 | 1/2006 |
| WO | 03/069934 A1 | 8/2003 |

OTHER PUBLICATIONS

3GPP, LTE; "3rd Generation Partnership Project; Technical Specification Group Radio Access Network; Evolved Universal Terrestrial Radio Access (E-UTRA);Radio Resource Control (RRC); Protocol specification (Release 10)"; 3GPP TS 36.331 V10.11.0 (Sep. 2013) Technical Specification; Sep. 2013; pp. 1-308.

(Continued)

*Primary Examiner* — Curtis A Alia
(74) *Attorney, Agent, or Firm* — Patent Portfolio Builders PLLC

(57) ABSTRACT

A set of radio resources are allocated to a first user equipment (110). The radio network node (130) receives a request for radio resources from a second user equipment (120) being associated with a first or second category. Furthermore, the radio network node (130) measures an inactivity time period of the first user equipment (110). Then, the radio network node (130) releases the set of radio resources when the inactivity time period exceeds a threshold to be applied dependent on the category of the request. The releasing of the set of radio resources is triggered by the request.

19 Claims, 3 Drawing Sheets

(56) References Cited

U.S. PATENT DOCUMENTS 8,638,750 B2* 1/2014 Wu .................. H04W 72/0433
370/331
2002/0172178 A1 11/2002 Suzuki et al.
2012/0113905 A1* 5/2012 Anderson ........... H04W 76/068
370/329

OTHER PUBLICATIONS

3GPP, LTE; "3rd Generation Partnership Project; Technical Specification Group Radio Access Network; Evolved Universal Terrestrial Radio Access Network (E-UTRAN); S1 Application Protocol (S1AP) (Release 12)"; 3GPP TS 36.413 V12.3.0 (Sep. 2014); Sep. 2014; pp. 1-290.

International Telecommunication Union; "Framework for the Radio Interface(s) and Radio Sub-System Functionality for International Mobile Telecommunications-2000 (IMT-2000)"; ITU-R M.1035 Recommendation; 1994; pp. 1-21.

International Telecommunication Union; "Framework and overall objectives of the future development of IMT-2000 and systems beyond IMT-2000"; ITU-R M.1645 Recommendation; 2003; pp. 1-24.

GSM Association; "Network Efficiency Task Force Fast Dormancy Best Practices" V1.0; May 26, 2010; pp. 1-21.

International Telecommunication Union; "Recommendation X.20, Data Communication Networks' Information Technology—Open Systems Interconnection—Structure of Management Information: Management Information Model"; The International Telegraph and Telephone Consultative Committee (CCITT); ; Jan. 1992; pp. 1-28.

International Telecommunication Union; "Recommendation E.800, Telephone Network and ISDN, Quality of Service, Network management and Traffic Engineering—Terms and Definitions Related to Quality of Service and Network Performance Includign Dependability"; Telecommunication Standardization Sector of ITU (ITU-T); Aug. 1994; pp. 1-57.

International Search Report issued in corresponding International application No. PCT/SE2012/050408, date of mailing Sep. 27, 2012.
Written Opinion of the International Searching Authority issued in corresponding International application No. PCT/SE2012/050408, date of mailing Sep. 27, 2012.

* cited by examiner

METHOD AND RADIO NETWORK NODE FOR MANAGING RADIO RESOURCES

TECHNICAL FIELD

Embodiments herein relate to a method and a radio network node in a cellular radio communication system. In particular, a radio network node and a method therein for managing radio resources are disclosed.

BACKGROUND

In communication systems and computer systems, a so called prioritization function resolves conflicts in situations where resources in the systems are limited. The conflicts relate to which task or connection should be allowed to use the resources.

A known method for prioritization is based on pre-emption. In a pre-emption based prioritization method for a computer system, an ongoing task will be interrupted for the benefit of a further task with higher priority than the ongoing task. When the ongoing task is interrupted, its resources are released and thus returned to the system before the ongoing task has been completed, i.e. the ongoing task is pre-empted. Then the returned resources may be used by the further task. It is intended that the interrupted task, which previously was the ongoing task, will be resumed when the further task with higher priority has been completed. Queuing schemes place tasks in a queue, in which the tasks remain while waiting for resources to be available. In the context of a computer system, a resource is released when the further task is finalized.

In cellular radio communication systems, prioritization is performed at many levels. For example, prioritization for a connection associated with a user equipment is managed at a level where admission control occurs. The admission control for the connection is performed by a radio base station of the cellular radio communication system at initial access and at handover of the user equipment. Hence, when a user equipment needs a connection, a request is sent from the user equipment to the radio base station which then controls admission of the request.

During handover, a connection of the user equipment may be moved from a first base station to a second base station. Hence, an aspect of mobility applies to connections, but not to tasks. In cases when the second base station is at congestion, i.e. resources available for connections are sparse or non-existent, the second base station priorities resources to be used for handling user equipments performing handover to the second base station. When user equipments performing handover are prioritized, it may happen that a user equipment performing initial access to the second base station is not allowed to access the second base station. In this manner, mobility of user equipments is provided as seamlessly as possible.

When dealing with congestion, a key aspect is how inactive User Equipments (UE) are managed in the base station. In typical radio interfaces, such as International Mobile Telecommunication 2000 (IMT-200) family and its enhancements, resource allocations are strongly influenced by a protocol state model. The protocol state model defines two states of a user equipment in relation to a base station; connected state and idle state. Radio resources are allocated to user equipments in connected state. The radio resources are released when the user equipment is transitioned to idle state. The transition from connected state to idle state is usually performed when the user equipment has been inactive for a specific time period, which will be referred to as an idle state time period herein. When the idle state time period has passed, it is no longer plausible to assume that the user equipment will send or receive any user data in a near future.

According to a known method for prioritizing handover over initial access a reservoir of radio resources are reserved. The reservoir of radio resources are reserved for the benefit of admitting a request for radio resources in conjunction with handover (handover request) to the base station. Should the base station be completely congested, i.e. the only radio resources available for allocation are those in the reservoir, any request for radio resources in conjunction with initial access (initial access request) will be blocked. In effect, the number of connections typically held by the base station is reduced, since the reservoir will always reserve some radio resource for handover requests. Though, sometimes all reserved radio resources may be allocated to connections established in response to handover requests.

In Long-Term Evolution (LTE) systems, prioritization at the level of admission control is suggested to be handled by an Allocation and Retention Priority (ARP) function. With the ARP function, different levels of priority may be set for different connections. Therefore, when a first base station detects that a first connection needs to be handed over to a second base station, the level of priority for the first connection is increased, or boosted. When a second connection at the second base station has a lower priority level than the increased level of priority of the first connection, the radio resources of the second connection will be released in case the second base station has no available radio resources. Hence, a request pertaining to radio resources for the first connection will be admitted thanks to that the radio resources of the second connection can be used by the first connection. In this manner, it is intended to be assured that the request for radio resources, to be used by the first connection, at the second base station is admitted. If a first ARP level of the first connection, before the first ARP level is increased due to ongoing handover, and a second ARP level of the second connection are the same, a problem may arise. The problem is that it is not straight forward to determine which of the first and second connections to prioritize. It seems inappropriate to release the already admitted second connection, just because the first connection is performing handover. It seems inappropriate because the first and second connections are comparable in terms of priority, i.e. the connections have the same or similar ARP level(s). Moreover, considering the amount of possible ARP levels, it is expected to be cumbersome to determine which ARP level to assign to the connection in order to obtain a desired prioritization.

SUMMARY

An object of embodiments of the invention is to improve management of radio resources in a cellular radio communication system.

According to an aspect, the object is achieved by a method for managing radio resources. A set of radio resources are allocated to a first user equipment. The radio network node receives a request for radio resources from a second user equipment. Furthermore, the radio network node measures an inactivity time period of the first user equipment. Then, the radio network node releases the set of radio resources when the inactivity time period exceeds a threshold. The threshold indicates that the set of radio resources are releasable due to inactivity of the first user equipment. The releasing of the set of radio resources is triggered by the request.

According to another aspect, the object is achieved by a radio network node configured to manage radio resources. A set of radio resources can be allocated to a first user equipment. The radio network node comprises a receiver configured to receive a request for radio resources from a second user equipment. Moreover, the radio network node comprises a processing circuit configured to measure an inactivity time period of the first user equipment. The processing circuit is further configured to release the set of radio resources when the inactivity time period exceeds a threshold, wherein the threshold indicates that the set of radio resources are releasable due to inactivity of the first user equipment. Moreover, the processing circuit is configured to release the set of radio resources in response to the request.

According to embodiments herein, the releasing of the set of radio resources is triggered by the request. Expressed differently, the releasing is performed in response to the request. Hence, the releasing of the set of radio resources is conditional upon that the inactivity time period has exceeded the threshold and that the request from the second user equipment has been received by the radio network node. Therefore, the set of radio resources are released only when the first user equipment is considered to be inactive in view of the threshold. Management of radio resources is thus improved in that radio resources are only released when the set of radio resources are unused due to inactivity. As a result, the above mentioned object is achieved.

Advantageously, radio resources, which are allocated to user equipments that are considered to be inactive, will be released upon reception of a request for radio resources.

Another advantage is that blocking of initial access requests is reduced thanks to that the need for a reservoir of radio resources reserved for handover requests is alleviated.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
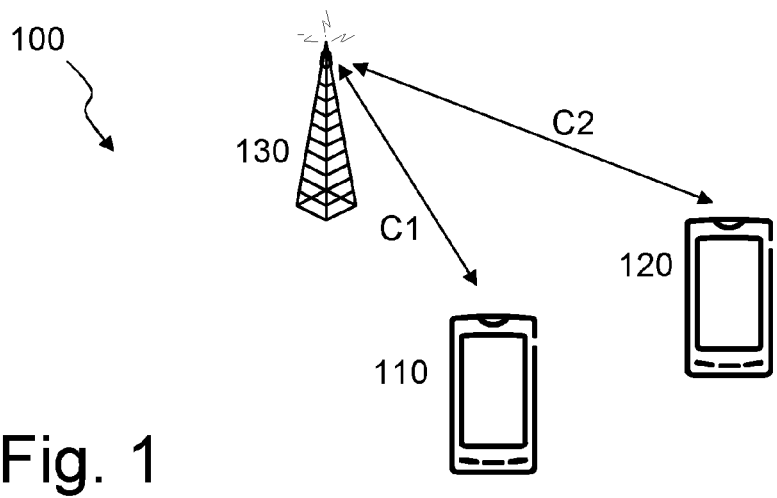
FIG. 1 is a schematic overview of an exemplifying cellular radio communication system in which exemplifying embodiments may be implemented.

Throughout the following description similar reference numerals have been used to denote similar elements, network nodes, parts, items or features, when applicable. In the Figures, features that appear in some embodiments are indicated by dashed lines.

FIG. 1 shows a cellular radio communication system 100, such as an LTE system, or any other cellular network technology supporting handover from one cell to another.

The cellular radio communication system 100 comprises a radio network node 130. The radio network node 130 may be an evolved NodeB (eNB), a radio base station, a radio network controller or a radio base station controller.

A first and a second user equipment 110, 120 may be located in the vicinity of the radio network node 130. The first user equipment 110 is connected to the radio network node 130. This means that the radio network node 130 has allocated radio resources for holding a first connection C1 towards the first user equipment 110. In an exemplifying scenario, illustrated with reference to FIG. 2, it will be described how a second connection C2 may be established.

As used herein, the term "connection" may refer to a Radio Bearer, such as a Signalling Radio Bearer (SRB) 1, as described in TS 36.331 or the like.

As used herein, the term "user equipment" may refer to a mobile phone, a cellular phone, a Personal Digital Assistant (PDA) equipped with radio communication capabilities, a smartphone, a tablet computer, a laptop equipped with an internal or external mobile broadband modem, a portable electronic radio communication device or the like. The concept of user equipment also comprises devices with communication capability of machine-type character such as sensors, measurement devices etc. that not necessarily is in any interaction with a user.

Figure 2:
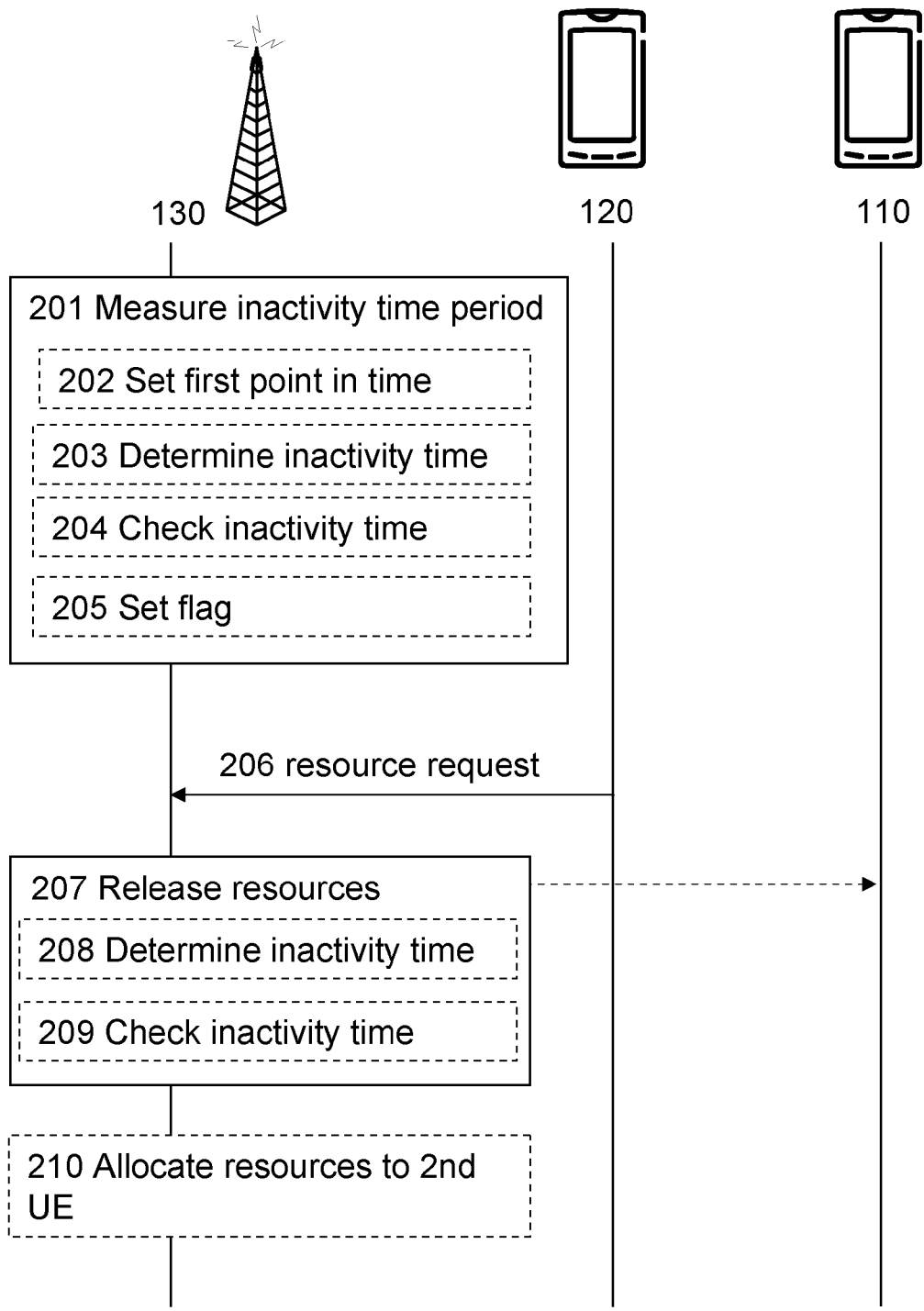
FIG. 2 is a schematic, combined signalling scheme and flowchart illustrating an exemplifying method performed in the cellular radio communication system according to FIG. 1.

In FIG. 2, a schematic combined signalling and flowchart of an exemplifying method in the radio communication system of FIG. 1 is illustrated. The radio network node 130 performs a method for releasing a set of radio resources. The release of the set of radio resources are performed in conjunction with admitting the second user equipment 120 into the radio network node 130.

As a prerequisite, the set of radio resources are allocated to a first user equipment 110. Moreover, as a further prerequisite, the radio network node 130 does not have any available radio resources, i.e. all radio resources handled by the radio network node 130 are allocated to connections for user equipments connected to the radio network node 130. A connected user equipment may refer to a user equipment in RRC_CONNECTED_MODE as known from Third Generation Partnership Project (3GPP).

The following actions may be performed, in any suitable order.

Action 201

In order to determine if the first user equipment 110 is inactive, the radio network node 130 measures an inactivity time period of the first user equipment 110. In action 207 below, the inactivity time period will be used.

The inactivity time period may indicate a difference between a first point in time and a second point in time. In the Figure(s), the inactivity time period is referred to as inactivity time.

The first point in time may indicate time at most recent transmission of user data for the first user equipment 110. Expressed somewhat differently, the most recent transmission is the last transmission, comprising user data, transmitted by the first user equipment 110. Transmissions relating to control signalling, such as channel quality reports or the like, are not taken into account when measuring the inactivity time period. Thus, a channel quality report does not set the first point in time.

The second point in time may then indicate time at reception of the request from the second user equipment 120. Alternatively, the second point in time may be at periodic or irregular intervals from the first point in time.

Action 202

In order to measure as in action 201 above, the first point in time and the second point in time may be established.

The radio network node 130 may thus set the first point in time, which is indicates time at most recent transmission of user data for the first user equipment 110. As an example, the radio network node 130 stores the first point in time in a memory 540 shown in FIG. 5 below.

Action 203

When the second point in time indicates time at periodic or irregular intervals from the first point in time, the radio network node 130 may determine the inactivity time period as a difference between the first point in time and the second point in time.

Action 204

Next, following action 203, the radio network node 130 may check whether the inactivity time period exceeds the threshold.

Action 205

Then after action 204, the radio network node 130 may set a flag to indicate that the set of radio resources are eligible for release. This action is performed when the inactivity time period exceeds the threshold.

As an example, when the flag is set to one, it shall mean that if a request for radio resources is received, then the radio network node 130 may release the set of radio resources. In case, there are multiple sets of radio resources, there will be multiple flags, where each flag is associated to a respective set of radio resources.

When actions 203, 204 and 205 are performed, the radio network node 130 prepares for a reception of a request for radio resources, as in action 206. Thus, when an actual request for radio resources is received, the radio network node 130 may advantageously merely check the flag and proceed accordingly. As a consequence, processing time of the request for radio resources may be reduced as compared to when determination of the inactivity time period and the checking, as in action 208 and 209 below, are performed upon reception of a request.

However, should there be a transmission of user data to/from the first user equipment 110 the flag would have to be reset such as to indicate that the set of radio resource allocated to the first user equipment 110 are not eligible for release.

Action 206

The radio network node 130 receives a request for radio resources from the second user equipment 120. In this manner, the second user equipment 120 seeks to be admitted into the radio network node 130. For example, the radio network node 130 may seek to be admitted at initial access or at handover.

The request may indicate that the second user equipment 120 needs radio resources in order for a connection to be established. The connection may enable communication between the radio network node 130 and the second user equipment 120.

The request may be an admission request, such as an RRCConnectionRequest message. The RRCConnectionRequest message is specified in TS 36.331.

Action 207

The radio network node 130 releases the set of radio resources when the inactivity time period exceeds a threshold. The inactivity time period exceeds the threshold when the inactivity time period is greater than or equal to the threshold. The threshold indicates that the set of radio resources are releasable due to inactivity of the first user equipment 110. In a more detailed example, with reference to FIG. 4, the threshold and categories of the request are considered.

The releasing of the set of radio resources according to embodiments of this invention is triggered by the request. This means that the radio network node 130 checks whether or not a request for radio resources has been received. Then, the radio network node 130 performs the releasing of the radio resources only when a request has been received. Thus, improved management of radio resources in conjunction with admission control is obtained.

Furthermore, the radio network node 130 may send a message to the first user equipment 110. The message may inform the first user equipment 110 about the release of the set of radio resources. One example in LTE of such a message is RRC connection release.

Action 208

When the second point in time indicates time at reception of the request, the radio network node 130 may determine the inactivity time period as a difference between the first point in time and the second point in time.

Action 209

Following action 208, the radio network node 130 may check whether the inactivity time period exceeds the threshold.

When actions 208 and 209 are performed, the radio network node 130 only determines the inactivity time period and compares, or checks, with the threshold when a request has been received. Thus, the radio network node 130 only spends processing resources for this purpose when required.

Action 210

The radio network node 130 may allocate at least some of the radio resources of the set to the second user equipment 120. In this manner, the request is granted and the second user equipment is admitted into the radio network node 130.

Figure 3:
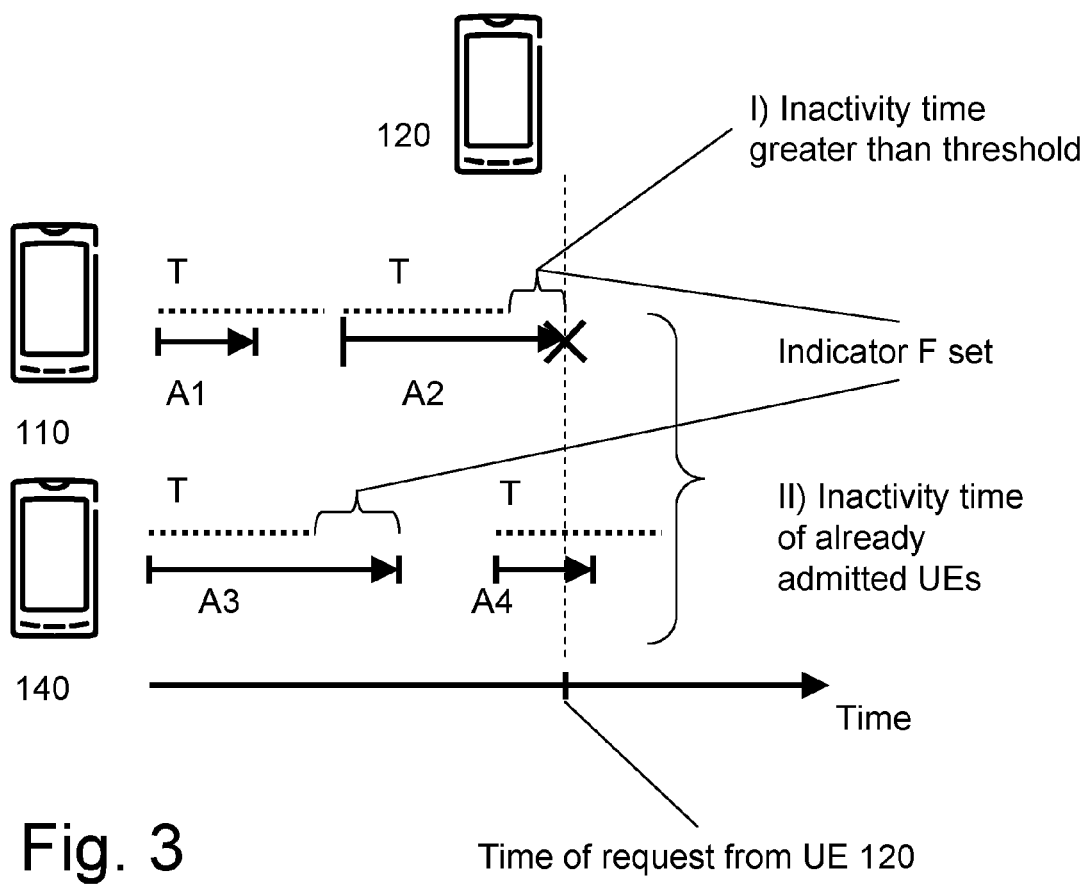
FIG. 3 is schematic overview illustrating an exemplifying scenario according to embodiments herein.

In FIG. 3, a schematic overview of an exemplifying scenario is shown. In this scenario, a third user equipment 140, in addition to the first and second user equipments 110, 120 of FIG. 1, is illustrated.

Inactivity time periods A1, A2, A3, A4 from last transmission of user data are illustrated for the first user equipment 110 and the third user equipment 140. Since the inactivity time period A2 is greater than or equal to the threshold T at time of the request, shown by the dashed line, radio resources allocated to the first user equipment 110 will be released.

In contrast, the inactivity time period A4 of the third user equipment 140 is less than the threshold T. Therefore, the radio resources allocated to the third user equipment 140 are not released.

In some examples, the radio network node 130 checks whether the inactivity time period is greater than or equal to the threshold when the request for radio resources has been received. In this manner, comparison between the inactivity time period and the threshold are only performed when there is a need for release of radio resources.

In other examples, the radio network node 130 compares a current inactivity time period A3 to the threshold T without first being triggered by a request. This kind of comparisons may be made at periodic intervals or irregularly such as when the radio network node 130 has overcapacity in terms of processing power. In these examples, the radio network node 130 sets an indicator F, such as a flag or the like. The indicator F is set to indicate that radio resources are eligible for release in view of incoming requests for radio resources when the threshold T is less than the current inactivity time period A3. Notably, in case of a request and the following possible release of radio resources, any such release of the radio resources are still triggered by, or performed in response to, the request. Inactivity time period A1 is not long enough compared to the threshold T. Hence, the indicator F is not set to indicate that resources are eligible for release.

In order to be able to prioritize between requests of different categories, a respective threshold for each category that is to be treated differently than other requests is required. Also, requests within the same category may be treated as different categories when the requests are associated with different levels within the same category. The different levels refer here to any levels that are applicable within the category. For example, the levels may be degrees of resource utilization in case the category refers to resource utilization as explained below.

Therefore, in some embodiments, the request is associated with a first category of requests or a second category of requests. For example, the request may be associated with handover requests or initial access requests. These categories of requests have been mentioned above. It is to be noted that any number of categories may be implemented according to embodiments.

Examples of the above mentioned categories and further categories are thus listed here. Hence, the first category of requests and the second category of requests may relate to one or more of:

requests in conjunction with initial access and requests in conjunction with handover, respectively;

requests associated with a first Allocation and Retention Priority (ARP) and a second ARP, respectively;

requests associated with a first establishment cause and a second establishment cause, respectively; and requests associated with a first degree of resource utilization and a second degree of resource utilization, respectively.

In the following, each of the items is the list above will be briefly explained.

Initial access relates to when the second user equipment 120 is initially accessing, e.g. at power up of the second user equipment 120, the radio network node 130 in order to request radio resources.

Handover relates to when the second user equipment 120 is handed over to the radio network node 130 from a further network node (not shown).

Priority of an E-RAB is signified by its ARP settings and expresses how aggressively, the radio network node 130 may pre-empt resources already assigned at the time of the request.

Establishment cause may be set to the value "emergency" (see TS 36.331). Requests that are set to "emergency" may for instance be prioritized compared to any other value(s) of establishment cause. As described herein, prioritization among requests may be based on differentiation of the inactivity time period.

The resource utilization may be represented by Quality of service Class Indicator (QCI). Hence, the resource utilization relates to expected radio resource utilization if, or when, a request of the first degree of resource utilization would be granted. Resource utilization may also be represented by Guaranteed Bit Rate (GBR) values, which in LTE is indicated by the GBR QoS Information (see TS 36.413).

In examples, where the indicator F is used, there a plurality of indicators, one for each category or levels within a category, would be required to handle prioritization between categories or levels of within a category.

Figure 4:
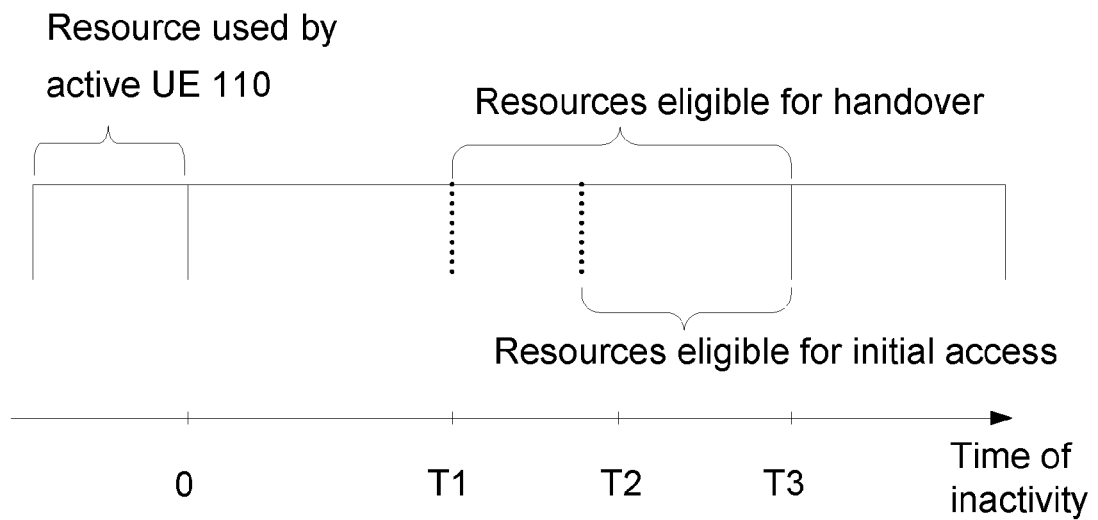
FIG. 4 is a timeline illustrating various thresholds for indicating inactivity.

Now turning to FIG. 4, an exemplifying timeline is shown in order to illustrate prioritization among requests of different categories. At the timeline, a plurality of thresholds T0, T1, T2, T3 are indicated. Each of the thresholds indicates that the set of radio resources are releasable due to inactivity of the first user equipment 110.

As mentioned above, a respective threshold for each category may enable prioritization. Hence, the threshold may comprise a first threshold associated with the first category of requests and a second threshold associated with the second category of requests.

As a first example, the first threshold T1 relates to handover requests and the second threshold T2 relates to initial access requests. Then, handover requests will be prioritized over initial access requests when the first threshold is less than the second threshold.

As a second example, the first degree of resource utilization may be represented by a first QCI and the second degree of resource utilization may be represented by a second QCI. The first QCI may represent a first service that is known to require the first degree of resource utilization and the second QCI may represent a second service that is known to require a second degree of resource utilization. The first degree of resource utilizations is assumed to be less than the second degree of resource utilization. Now, if the first QCI and the second QCI is associated with the first and second threshold, respectively, admission requests of the first degree of resource utilization will be prioritized over admission requests of the second degree of resource utilization when the first threshold is lower than the second threshold. In a scenario, in which available radio resources are limited or even non-existent, this may be beneficial.

As a third example, the first degree of resource utilization may be represented by a first GBR requested by a first user equipment and the second degree of resource utilization may be represented by a second GBR requested by a second user equipment. Assume that the first GBR is smaller than the second GBR. Now, if the first GBR and the second GBR is associated with the first and second threshold, respectively, admission requests of the first degree of resource utilization will be prioritized over admission requests of the second degree of resource utilization when the first threshold is less than the second threshold. In a scenario, in which available radio resources are limited or even non-existent, this may be beneficial.

More generally, exemplified with the first and second examples above, the release of radio resources are based on both the inactivity time period and the category associated with the request. The lower the first threshold is, the higher priority the first category of requests will have.

The threshold, such as the first and/or second thresholds T1, T2, is lower than a third threshold T3, such as an IDLE_MODE threshold. The third threshold T3 indicates unconditional release of radio resources. The unconditional release is performed without being triggered by a request. Typically, it is desired that the third threshold is set such that signalling in conjunction with establishment of a connection is avoided to a large extent. This means that the inactivity time period up to the third threshold shall be long enough to, at a high probability, rule out existence of further transmissions of user data. In LTE it is considered reasonable to release user equipment that has been inactive long enough in relation to the third threshold. The value of the threshold T3 may be decided by a manufacturer of the radio network node 130.

Figure 5:
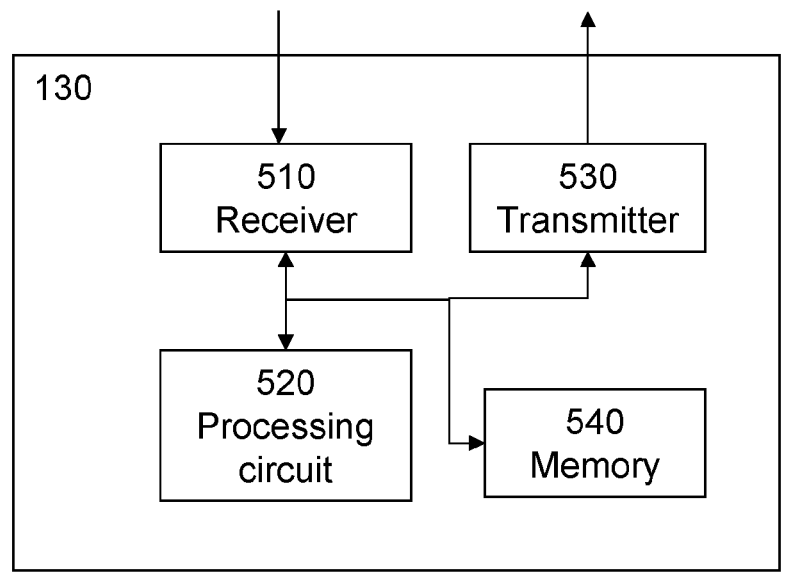
FIG. 5 is a block diagram illustrating an exemplifying radio network node configured to perform the methods illustrated in FIG. 2.

With reference to FIG. 5, a schematic block diagram of the radio network node 130 is shown. The radio network node 130 is configured to perform the methods illustrated in FIG. 2. Hence, the radio network node 130 is configured to release a set of radio resources.

As mentioned above, the radio network node 130 may be a radio base station, a radio network controller or a radio base station controller. The set of radio resources can be allocated to a first user equipment 110.

The radio network node 130 comprises a receiver 510 configured to receive a request for radio resources from a second user equipment 120.

The request may be associated with a first category of requests or a second category of requests.

The first category of requests and the second category of requests may be related to one or more of:

requests in conjunction with initial access and requests in conjunction with handover, respectively;

requests associated with a first Allocation and Retention Priority and a second Allocation and Retention Priority, respectively;

requests associated with a first establishment cause and a second establishment cause, respectively; and requests associated with a first degree of resource utilization and a second degree of resource utilization, respectively.

The threshold may be configured to comprise a first threshold associated with the first category of requests and a second threshold associated with the second category of requests.

Moreover, the radio network node 130 comprises a processing circuit 520 configured to measure an inactivity time period of the first user equipment 110. The processing circuit 520 is further configured to release the set of radio resources when the inactivity time period exceeds a threshold. The threshold indicates that the set of radio resources are releasable due to inactivity of the first user equipment 110. Furthermore, the processing circuit 520 is configured to release the set of radio resources in response to the request.

The inactivity time period may be configured to indicate a difference between a first point in time and a second point in time.

The first point in time may be configured to indicate time at most recent transmission of user data for the first user equipment 110.

The second point in time may be configured to indicate time at reception of the request from the second user equipment 120, or the second point in time may be configured to indicate time at periodic or irregular intervals from the first point in time. The processing circuit 520 may be configured to set the first point in time, which is indicates time at most recent transmission of user data for the first user equipment 110.

When the second point in time indicates time at reception of the request, the processing circuit 520 may be configured to determine the inactivity time period as a difference between the first point in time and the second point in time, and to check whether the inactivity time period exceeds the threshold.

When the second point in time indicates time at periodic or irregular intervals from the first point in time, the processing circuit 520 may be configured to determine the inactivity time period as a difference between the first point in time and the second point in time, to check whether the inactivity time period exceeds the threshold, and to set a flag to indicate that the set of radio resources are eligible for release, when the inactivity time period exceeds the threshold.

The processing circuit 520 may further be configured to allocate at least some of the radio resources of the set to the second user equipment 120.

The processing circuit 520 may be a processing unit, a processor, an application specific integrated circuit (ASIC), a field-programmable gate array (FPGA) or the like. As an example, a processor, an ASIC, an FPGA or the like may comprise one or more processor kernels.

The threshold may be configured to be less than a third threshold. The third threshold may be configured to indicate unconditional release of radio resources. The unconditional release may be performed without triggering by the request.

The radio network node 130 may further comprise a transmitter 530. The transmitter may be configured to send a message to the second user equipment 120. The message may indicate that the set of radio resource have been or is to be released.

The radio network node 130 further comprises a memory 540 for storing software to be executed by, for example, the processing circuit. The software may comprise instructions to enable the processing circuit to perform the method in the radio network node 130 as described above in conjunction with FIG. 2. The memory 540 may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a radio network node for managing radio resources, wherein a set of radio resources are allocated to a first user equipment, wherein the method comprises:

measuring an inactivity time period of the first user equipment;

receiving a request for radio resources from a second user equipment;

determining a category of the request, wherein the category of the request is one of at least a first category and a second category of requests; and releasing, in response to receipt of the request, the set of radio resources when the inactivity time period exceeds a threshold associated with the determined category of the request, wherein the first category of requests is associated with a first threshold and the second category of requests is associated a second threshold that is a longer time period than the first threshold, wherein the thresholds indicate that the set of radio resources are releasable due to inactivity of the first user equipment.

2. The method according to claim 1, wherein the first category of requests and the second category of requests relate to one or more of:

requests in conjunction with initial access and requests in conjunction with handover, respectively;

requests associated with a first Allocation and Retention Priority and a second Allocation and Retention Priority, respectively;

requests associated with a first establishment cause and a second establishment cause, respectively; and requests associated with a first degree of resource utilization and a second degree of resource utilization, respectively.

3. The method according to claim 1, wherein the inactivity time period indicates a difference between a first point in time and a second point in time, wherein the first point in time indicates time at most recent transmission of user data for the first user equipment, and wherein the second point in time indicates time at reception of the request from the second user equipment, or the second point in time indicates time at periodic or irregular intervals from the first point in time.

4. The method according to claim 3, wherein the measuring comprises:

setting the first point in time, which is indicates time at most recent transmission of user data for the first user equipment.

5. The method according to claim 4, when the second point in time indicates time at reception of the request, wherein releasing comprises:

determine the inactivity time period as a difference between the first point in time and the second point in time; and checking whether the inactivity time period exceeds the threshold associated with the determined category of request.

6. The method according to claim 4, when the second point in time indicates time at periodic or irregular intervals from the first point in time, wherein the measuring further comprises:

determine the inactivity time period as a difference between the first point in time and the second point in time; and checking whether the inactivity time period exceeds the threshold associated with the determined category of request; and when the inactivity time period exceeds the threshold, setting a flag to indicate that the set of radio resources are eligible for release.

7. The method according to claim 1, wherein the first and second thresholds are lower than a third threshold, wherein the third threshold indicates unconditional release of radio resources, wherein the unconditional release is performed without triggering by the request.

8. The method according to claim 1, wherein the method further comprises:

allocating at least some of the radio resources of the set to the second user equipment.

9. The method according to claim 1, wherein the radio network node is a radio base station, a radio network controller or a radio base station controller.

10. A radio network node configured to manage radio resources, wherein a set of radio resources can be allocated to a first user equipment wherein the radio network node comprises:

a receiver configured to receive a request for radio resources from a second user equipment; and a processing circuit configured to measure an inactivity time period of the first user equipment, determine a category of the request, wherein the category of the request is one of at least a first category and a second category of requests, release, in response to receipt of the request, the set of radio resources when the inactivity time period exceeds a threshold associated with the determined category of the request, wherein the first category of requests is associated with a first threshold and the second category of requests is associated a second threshold that is a longer time period than the first threshold, wherein the thresholds indicate that the set of radio resources are releasable due to inactivity of the first user equipment.

11. The radio network node according to claim 10, wherein the first category of requests and the second category of requests are related to one or more of:

requests in conjunction with initial access and requests in conjunction with handover, respectively;

requests associated with a first Allocation and Retention Priority and a second Allocation and Retention Priority, respectively;

requests associated with a first establishment cause and a second establishment cause, respectively; and requests associated with a first degree of resource utilization and a second degree of resource utilization, respectively.

12. The radio network node according to claim 10, wherein the inactivity time period is configured to indicate a difference between a first point in time and a second point in time, wherein the first point in time is configured to indicate time at most recent transmission of user data for the first user equipment, and wherein the second point in time is configured to indicate time at reception of the request from the second user equipment, or the second point in time is configured to indicate time at periodic or irregular intervals from the first point in time.

13. The radio network node according to claim 12, when dependent on claim 12, wherein the processing circuit is configured to set the first point in time, which is indicates time at most recent transmission of user data for the first user equipment.

14. The method according to claim 13, when the second point in time indicates time at reception of the request, wherein the processing circuit is configured to determine the inactivity time period as a difference between the first point in time and the second point in time, and to check whether the inactivity time period exceeds the threshold associated with the determined category of request.

15. The method according to claim 13, when the second point in time indicates time at periodic or irregular intervals from the first point in time, wherein the processing circuit is configured to determine the inactivity time period as a difference between the first point in time and the second point in time, to check whether the inactivity time period exceeds the threshold associated with the determined category of request, and to set a flag to indicate that the set of radio resources are eligible for release, when the inactivity time period exceeds the threshold.

16. The radio network node according to claim 10, wherein the first and second thresholds are configured to be lower than a third threshold, wherein the third threshold is configured to indicate unconditional release of radio resources, wherein the unconditional release is to be performed without triggering by the request.

17. The radio network node according to claim 10, wherein the processing circuit further is configured to allocate at least some of the radio resources of the set to the second user equipment.

18. The radio network node according to claim 10, wherein the radio network node is a radio base station, a radio network controller or a radio base station controller.

19. A method in a radio network node for managing radio resources, wherein a set of radio resources are allocated to a first user equipment, wherein the method comprises:

measuring an inactivity time period of the first user equipment;

receiving a request for radio resources from a second user equipment; and releasing the set of radio resources when the inactivity time period exceeds a first threshold and in response to the receipt of the request, wherein the threshold indicates that the set of radio resources are releasable due to inactivity of the first user equipment; and releasing the set of radio resources, independent of the receipt of the request, when the inactivity time period exceeds a second threshold, wherein the first threshold is less than the second threshold, and wherein when the inactivity time period exceeds the first threshold but is less than the second threshold the radio resources are released only when the request is received.

* * * * *